US008768921B2

(12) United States Patent
Ghosal et al.

(10) Patent No.: US 8,768,921 B2
(45) Date of Patent: Jul. 1, 2014

(54) COMPUTER-IMPLEMENTED INFORMATION REUSE

(75) Inventors: Sugata Ghosal, New Delhi (IN); Anup K. Ghosh, Kolkata (IN); Nandakishore Kambhatla, Bangalore (IN); Rose C. Kanjirathinkal, Calicut (IN); Asidhara Lahiri, Kolkata (IN); Debapriyo Majumdar, Kolkata (IN); Shajith I. Mohamed, Bangalore (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/277,307

(22) Filed: Oct. 20, 2011

(65) Prior Publication Data

US 2013/0103682 A1    Apr. 25, 2013

(51) Int. Cl.
  *G06F 17/30*  (2006.01)
  *G06F 11/07*  (2006.01)

(52) U.S. Cl.
  CPC ................. *G06F 11/0781* (2013.01)
  USPC ............ 707/731; 707/796; 706/25; 706/39; 714/12; 714/50

(58) Field of Classification Search
  CPC  G06F 11/0781; G06F 11/3075; G06F 19/345
  USPC ......... 707/748, 723, 735, 796, 728, 731, 759, 707/769, 682, E17.014, E17.063, 803, 707/E17.005, E17.044, E17.009, 776; 717/167, 168, 172, 128, 124, 126, 141; 714/38, 39, 25, 45, E11.145; 709/224, 709/229, 206; 713/152, 160, 165, 193; 715/709; 706/11, 12, 13, 50
  See application file for complete search history.

(56) References Cited

U.S. PATENT DOCUMENTS 6,587,847 B1 *  7/2003  Stier et al. .............. 707/999.002
7,233,955 B2     6/2007  Machida et al.
(Continued)

FOREIGN PATENT DOCUMENTS

JP            2009134737 A      6/2009

OTHER PUBLICATIONS

Zhihao Chen, Daniel Port, Yue Chen, and Barry Boehm—"Evolving an Experience Base for Software Process Research"—Lecture Notes in Computer Science vol. 3840, 2006, pp. 433-448.*

(Continued)

*Primary Examiner* — Jean B Fleurantin
*Assistant Examiner* — Anh Ly
(74) *Attorney, Agent, or Firm* — Ronald A. Kaschak; Keohane & D'Alessandro, PLLC (57) ABSTRACT

Embodiments of the present invention relate to an approach for reusing information/knowledge. Specifically, embodiments of the present invention provide an approach for retrieving previously stored data to satisfy queries (e.g., jobs/tickets) for solutions to problems while maintaining privacy/security of the data as well as ensuring the quality of the results. In a typical embodiment, a query for a solution to a problem is received and details are extracted therefrom. Using the details, a search is performed on a set of data stored in at least one computer storage device. Based on the search, a set of results will be generated and classified into a set of categories. In any event, the quality of each of the set of results will be assessed based on the usefulness of the set of results.

11 Claims, 6 Drawing Sheets

(56) References Cited

U.S. PATENT DOCUMENTS

| | | | |
|---|---|---|---|
| 7,565,338 B2* | 7/2009 | Beniaminy et al. | 706/47 |
| 7,707,129 B2* | 4/2010 | Zhuang et al. | 706/20 |
| 7,774,198 B2* | 8/2010 | Roulland et al. | 707/765 |
| 7,822,768 B2* | 10/2010 | Maymir-Ducharme et al. | 707/776 |
| 8,200,527 B1* | 6/2012 | Thompson et al. | 705/7.39 |
| 8,291,319 B2* | 10/2012 | Li et al. | 707/999.005 |
| 8,429,174 B2* | 4/2013 | Ramani et al. | 707/749 |
| 2002/0049743 A1 | 4/2002 | Hall | |
| 2003/0120654 A1* | 6/2003 | Edlund et al. | 707/7 |
| 2003/0144892 A1 | 7/2003 | Cowan et al. | |
| 2004/0044542 A1* | 3/2004 | Beniaminy et al. | 705/1 |
| 2004/0249809 A1* | 12/2004 | Ramani et al. | 707/4 |
| 2005/0120042 A1* | 6/2005 | Shuster et al. | 707/102 |
| 2005/0120112 A1 | 6/2005 | Wing et al. | |
| 2008/0091408 A1* | 4/2008 | Roulland et al. | 704/9 |
| 2008/0172574 A1* | 7/2008 | Fisher | 714/25 |
| 2008/0195642 A1 | 8/2008 | Voln | |
| 2008/0201279 A1* | 8/2008 | Kar et al. | 706/12 |
| 2008/0301076 A1* | 12/2008 | Timmins et al. | 706/46 |
| 2009/0042870 A1* | 2/2009 | Fellows et al. | 514/224.8 |
| 2009/0049000 A1* | 2/2009 | Hadar | 706/50 |
| 2009/0063387 A1* | 3/2009 | Beaty et al. | 706/50 |
| 2009/0254572 A1* | 10/2009 | Redlich et al. | 707/10 |
| 2010/0250497 A1* | 9/2010 | Redlich et al. | 707/661 |
| 2011/0040749 A1* | 2/2011 | Ceri et al. | 707/723 |
| 2011/0055699 A1* | 3/2011 | Li et al. | 707/E17.014 |
| 2012/0323828 A1* | 12/2012 | Sontag et al. | 706/12 |

OTHER PUBLICATIONS

C.K.M. Lee, William Ho, G.T.S. Ho, and H.C.W. Lau—"Design and development of logistics workflow systems for demand management with RFID" —Expert Systems with Applications, vol. 38, Issue 5, May 2011, pp. 5428-5437.*

Majumdar., D. et al., "Privacy Protected Knowledge Management in Services with Emphasis on Quality Data", CIKM '11, Oct. 24-28, 2011, Glasgow, Scotland, UK, 6 pages.

Grandison, T. et al. "Asset Reuse and Service Science: The Delicate Balance", Portland International Conference on Management of Engineering & Technology. 2008. Issue Date: Jul. 27-31, 2008, 6 pages.

Kay, D., et al., "BUS208—How Consona Supports the KCS Methodology", Oct. 14, 2010, 24 pages. http//crm.consona.com/content/webcasts/kcs-methodology.pdf.

Cordeiro, W. et al., "Changeminer: A Solution for Discovering IT Change Templates from Past Execution Traces", IFIP/IEEE International Symposium on Integrated Management, 2009, 8 pages.

Pant, P., "Provisioning in the Cloud with Point-and-Click Simplicity Using Your Existing Data Center Tools", Jan. 11, 2011, 4 pages.

SAManage, "Knowledge Base & Solutions", dated Jun. 26, 2011, 2 pages. http://www.samanage.com/products/knowledge_base.html.

* cited by examiner

COMPUTER-IMPLEMENTED INFORMATION REUSE

TECHNICAL FIELD

In general, embodiments of the present invention provide an approach for computer-implemented information/knowledge reuse. Specifically, the present invention provides a computer-based approach for information reuse while providing quality of data and data security/privacy.

BACKGROUND OF THE INVENTION

Information/knowledge reuse in computer-based services can be highly important and potentially can lead to increased efficiency and cost savings. In many current environments, as users/practitioners become senior users and move to higher levels or leave their existing teams, the knowledge they gained is often not maintained properly for others to use. As such, newer users are often forced to reacquire the same knowledge to process tickets/jobs. This problem is often compounded by the fact that the majority of users lack quality information about the solution. Moreover, a typical search engine operating over ticket data is not useful because when the user searches for a problem, most of the "top" results may match the problem, but may not contain adequate information about the solution. Still yet, existing approaches fail to provide effective data privacy and/or security. Since such data may contain personal information about the users, lack of proper privacy and/or security can create an additional set of problems.

SUMMARY OF THE INVENTION

In general, embodiments of the present invention relate to an approach for reusing information. Specifically, embodiments of the present invention provide an approach for retrieving previously stored data to satisfy queries (e.g., jobs/tickets) for solutions to problems while maintaining privacy/security of the data as well as ensuring the quality of the results. In a typical embodiment, a query for a solution to a problem is received and details are extracted therefrom. Using the details, a search is performed on a set of data stored in at least one computer storage device. Based on the search, a set of results will be generated and classified into a set of categories. Optionally, the set of results can be "sanitized" to remove any personal/private information. In any event, a quality of each of the set of results will be assessed based on the usefulness of the set of results, the usefulness being determined using at least one of a set of usefulness determination models (e.g., to determine a best match between the query and the results). Based on the assessed quality, the set of results can then be ranked and presented to the querying user.

A first aspect of the present invention provides a computer-implemented method for reusing information, comprising: receiving a query for a solution to a problem; extracting details from the query; performing a search on a set of data stored in at least one computer storage device using the details; generating a set of results based on the search; classifying the set of results into a set of categories; assessing a quality of each of the set of results based on a usefulness of the set of results, the usefulness being determined using at least one of a set of usefulness determination models; and ranking the set of results based on the quality as assessed.

A second aspect of the present invention provides a system for reusing information, comprising: a memory medium comprising instructions; a bus coupled to the memory medium; and a processor coupled to the bus that when executing the instructions causes the system to: receive a query for a solution to a problem; extract details from the query; perform a search on a set of data stored in at least one computer storage device using the details; generate a set of results based on the search; classify the set of results into a set of categories; assess a quality of each of the set of results based on a usefulness of the set of results, the usefulness being determined using at least one of a set of usefulness determination models; and rank the set of results based on the quality as assessed.

A third aspect of the present invention provides a computer program product for reusing information, the computer program product comprising a computer readable storage media, and program instructions stored on the computer readable storage media, to: receive a query for a solution to a problem; extract details from the query; perform a search on a set of data stored in at least one computer storage device using the details; generate a set of results based on the search; classify the set of results into a set of categories; assess a quality of each of the set of results based on a usefulness of the set of results, the usefulness being determined using at least one of a set of usefulness determination models; and rank the set of results based on the quality as assessed.

A fourth aspect of the present invention provides a method for deploying a system for reusing information, comprising: receive a query for a solution to a problem; extract details from the query; perform a search on a set of data stored in at least one computer storage device using the details; generate a set of results based on the search; classify the set of results into a set of categories; assess a quality of each of the set of results based on a usefulness of the set of results, the usefulness being determined using at least one of a set of usefulness determination models; and rank the set of results based on the quality as assessed.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention relate to an approach for reusing information/knowledge. Specifically, embodiments of the present invention provide an approach for retrieving previously stored data to satisfy queries (e.g., jobs/tickets) for solutions to problems while maintaining privacy/security of the data as well as ensuring a quality of the results. In a typical embodiment, a query for a solution to a problem is received and details are extracted therefrom. Using the details, a search is performed on a set of data stored in at least one computer storage device. Based on the search, a set of results will be generated and classified into a set of categories. Optionally, the set of results can be "sanitized" to remove any personal/private information. In any event, the quality of each of the set of results will be assessed based on the usefulness of the set of results, the usefulness being determined using at least one of a set of usefulness determination models (e.g., to determine a best match between the query and the results). Based on the assessed quality, the set of results can then be ranked and presented to the querying user.

Figure 1:
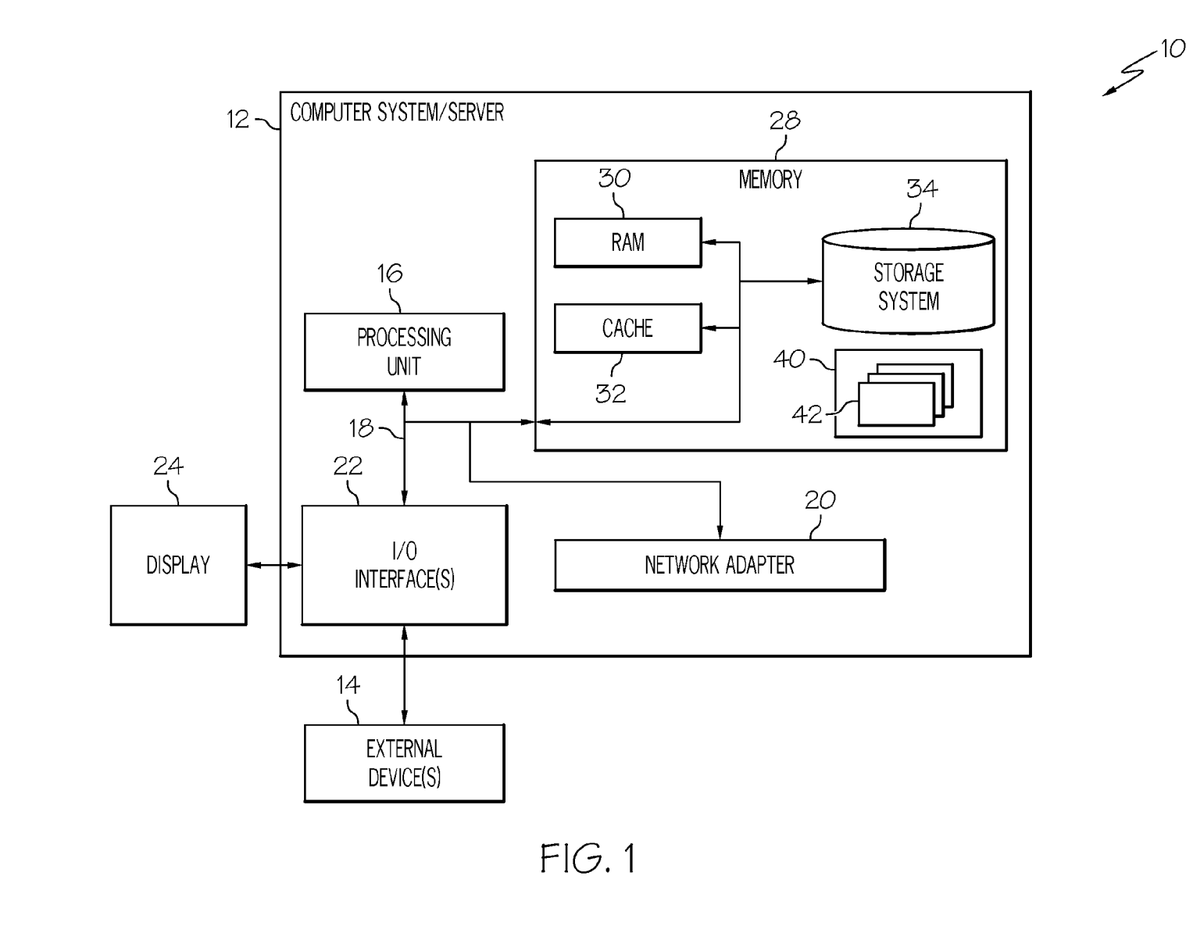
FIG. 1 depicts a computing node according to an embodiment of the present invention.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Information reuse program/utility 40, having a set (at least one) of program modules 42, may be stored in memory 28 by way of example, and not limitation, as well as an operating system, one or more application programs, other program modules, and program data. In general, information reuse program 40 performs the function of the present invention as described herein. For example, will provide information reuse functionality (with data quality assurance and/or sanitization) as discussed below.

Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
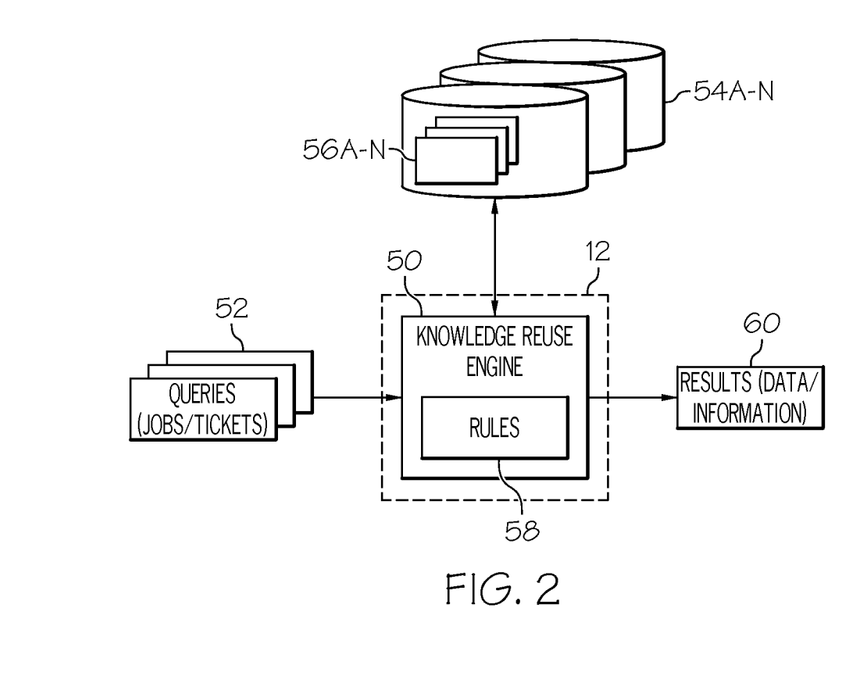
FIG. 2 depicts a system diagram according to an embodiment of the present invention.

Referring now to FIG. 2, a system diagram according to an embodiment of the present invention is shown. It is understood that the teachings recited herein may be practiced within a networked computing environment (e.g., a cloud computing environment). A stand-alone computer system/server 12 is shown in FIGS. 1 and 2 for illustrative purposes only. In the event, the teachings recited herein are practiced in a networked computing environment, each client need not have engine 50, rather engine 50 could be loaded on a server or server-capable device that communicates (e.g., wirelessly) with the clients to provide device protection therefor. Regardless, as depicted in FIG. 2, an information reuse engine (engine 50) is shown within computer system/server 12. In general, engine 50 can be implemented as program 40 on computer system 12 of FIG. 1 and can implement the functions recited herein. As further shown, engine 50 (in one embodiment) comprises a rules and/or computational engine that processes a set (at least one) of rules 58 and/or performs computations to provide information reuse hereunder.

Along these lines, engine 50 may perform multiple functions similar to a general-purpose computer using rules 58. Specifically, among other functions, engine 50 may (among other things): receive a query 52 (e.g., pursuant to a job/ticket) for a solution to a problem; extract details from the query; perform a search on a set of data 56A-N stored in at least one computer storage device 54A-N using the details; generate a set of results 60 based on the search 52; classify the set of results 60 into a set of categories; assess the quality of each of the set of results 60 based on the usefulness of the set of results, the usefulness being determined using at least one of a set of usefulness determination models; rank the set of results 60 based on the assessed quality; sanitize the set of results 60 to remove private/personal information; and/or present the set of results 60 to the querying user.

Figure 3:
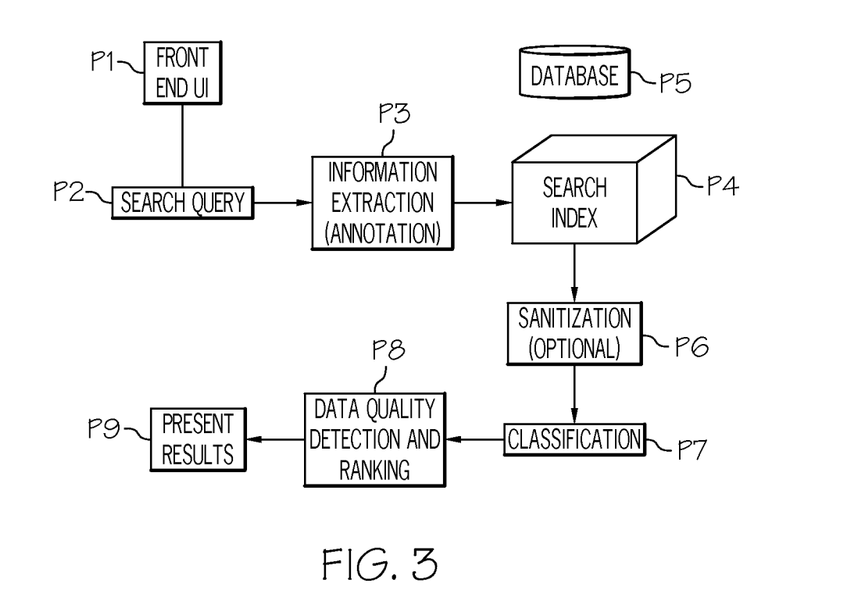
FIG. 3 depicts a process flow diagram according to an embodiment of the present invention.

Referring now to FIG. 3, these functions will be described in greater detail. Specifically, FIG. 3 shows a process flow diagram according to an embodiment of the present invention. It is understood that the functions discussed hereinbelow are typically enabled by engine 50 of FIG. 2. As shown, a user can operate a front end/user interface P1 to input a search query P2 to seek a solution to a problem or the like (e.g., with a computer-based service, etc.). Details/information (e.g., keywords, key phrases, etc.) will be extracted from the query P3 and used to perform a search using any known technique. Typically, the search will utilize database P5 and/or search index P4. A set of results will be obtained. In general, the results can be an optionally sanitized P6 (e.g., at the time the underlying data was previously stored or at the time the results are obtained). Specifically, private and/or personal information can be removed, redacted, obscured, etc., for the set of results. Regardless, the set of results will then be classified into a set of categories P7, and ranked according to quality P8 based on the usefulness of the information contained thereon (as determined using one or more usefulness determination models). The set of results will then be presented/displayed to the user P9.

Figure 4:
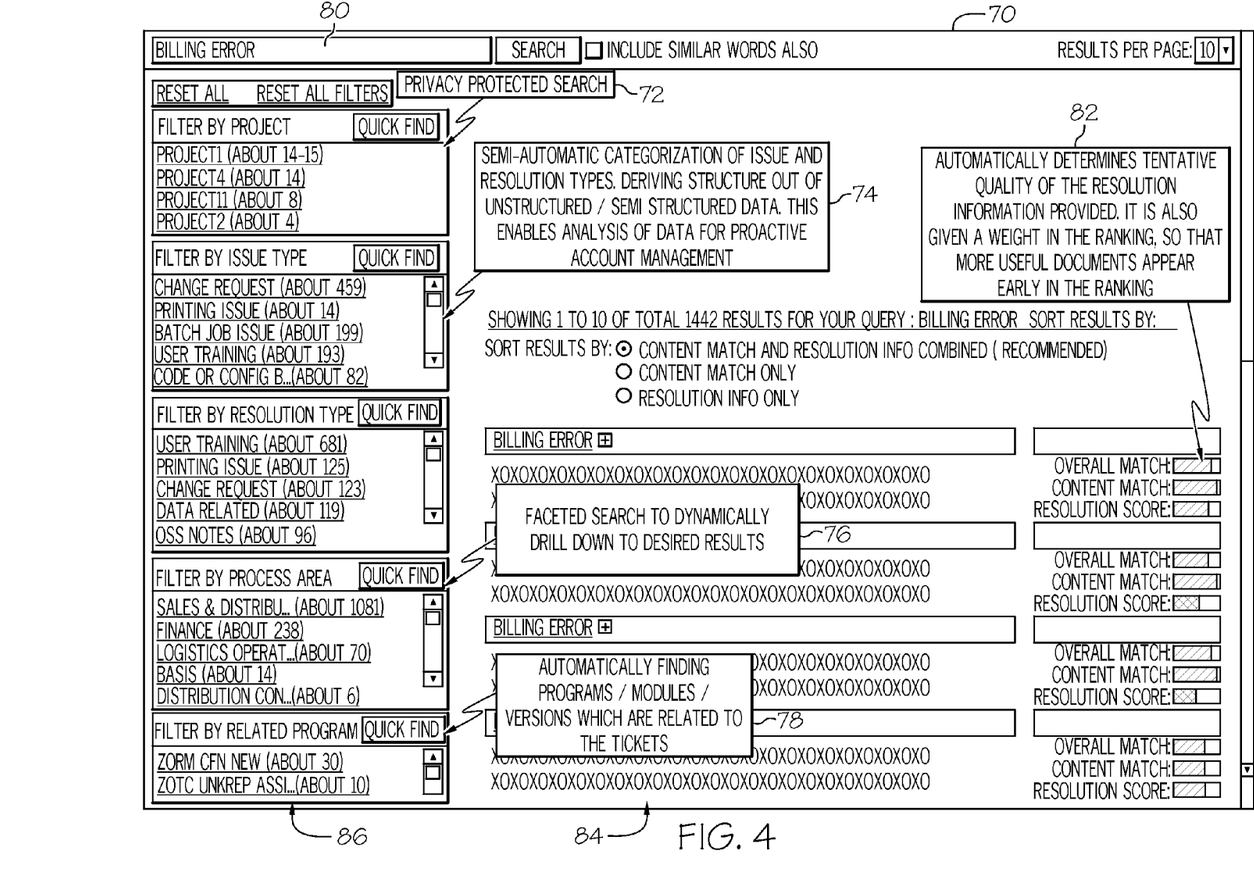
FIG. 4 depicts an illustrative user interface according to the present invention.

Referring now to FIG. 4, an illustrative user interface 70 is shown (e.g., as provided by engine 50 of FIG. 2). As shown, interface 70 comprises a search field 80 into which a search string/query can be entered by a user, and a result field for displaying a corresponding set of results 84. In addition, interface 70 also enables various featured hereunder. For example, interface 70 provides categorization of issues and corresponding results/solutions 74. This allows structure to be derived from unstructured or semi-structured data and enables analysis of data for proactive account management. Interface 70 also enables a faceted search capability 76 to "drill down" search results. Still yet, interface 70 provides an automatic finding feature 78 of programs/modules/versions related to the queries/tickets. Also, interface 70 indicated a relative quality 82 of the results based on usefulness (graphically depicted by weight). As further shown, interface 70 provides filter fields 86 that allow the set of results 84 to be filtered based upon project, issue type, solution/resolution type, process area, and/or applicable program.

As indicated above, one embodiment of the present invention allows for data stored and/or search results to be sanitized/cleansed of any private and/or personal information. This enables the use of "knowledge" (not private data) across accounts. In a typical embodiment, users/practitioners can view their own project's data in original form and other project's data in sanitized form. Along these lines, information sanitized can include (among other things) email addresses, URLs, phone numbers, social security numbers, addresses, customer lists, etc. To provide sanitization, users can define customer patterns to recognize private data (e.g., patterns with conditions such as "Starts with" AND/OR "Ends with" AND/OR "Contains"). In addition, sanitization "strengths" could also be assigned. Such examples could resemble the following:

Option 1: Strict—no data sharing. Only original data is present, no duplicate copy created. Only users of account "A" can see data of account "A."

Option 2: Sharing with sanitization.

Option 3: Sharing without sanitization. No sanitization, original data is made searchable by all.

Figure 5:
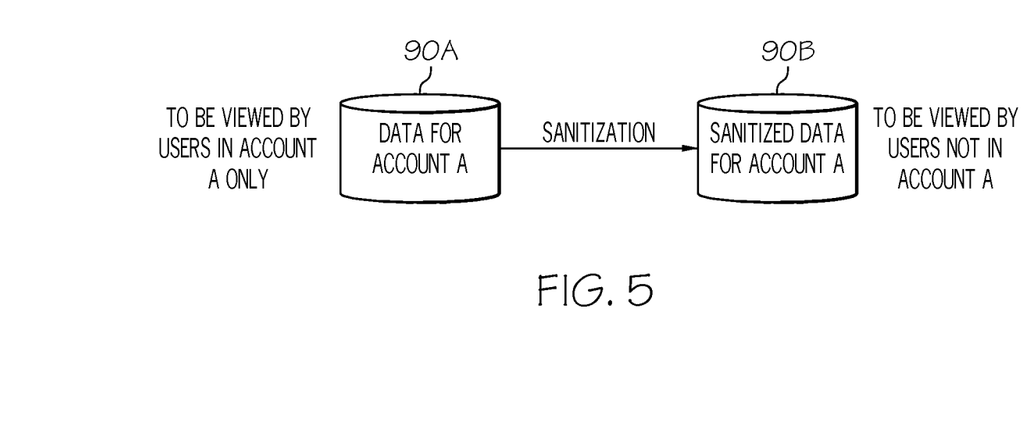
FIG. 5 depicts a diagram showing a sanitization process according to an embodiment of the present invention.

An example of Option 2 is shown in FIG. 5, whereby one repository 90A comprises data to be viewed by user in account "A" only, and a separate repository 90B is provided for users not in account "A". The latter would a sanitized version of the data that is in repository 90A.

As discussed above, embodiments of the present invention provide for a detection of the quality of each search result, and then a ranking of the search results based thereon. In general, the quality of a particular search result will be determined based on the usefulness of the information contained therein. Also, in general, the usefulness will be determined based on a set of usefulness determination models. Shown below are illustrative examples of such models:

1. Where usefulness of the information is estimated using classification models (trained domain-specific).
2. Where usefulness of the information is estimated using various structural and content level features derived from the text of the resolution part based on specified rules.
3. Where usefulness of the information in resolution is estimated through their correspondence with the information in a problem statement part of the query and/or job/ticket.
4. Where a combination of the above 3 is used to estimate the usefulness of the information in a resolution part of the query and/or job/ticket. Regardless of the usefulness determination model implemented, it is understood that this process can be performed iteratively through user feedback.

Illustrative Embodiments

Shown below are examples summarizing some of the features discussed above that can be provided in accordance with the embodiments of the present invention:

Embodiment 1: Search with Priority on Quality Data

Based on a one-time training (e.g., per domain, or set of accounts with similar tickets) on the sentences (alternatively, paragraphs or whole text) in the solution fields of tickets, a model is provided to classify the informativeness of each sentence (paragraphs or whole text, respectively) in the solution field of ticket data. For all the tickets in the same domain, a solution field can be classified using the above specified model(s) and a quality score (between 0 and 1) can be pre-computed and indexed along with the data. The search results can then be ranked by a combination (optionally, only by content or only by resolution score) of content match (default search engine score) and resolution score. As indicated above, the model to learn the quality can be enhanced or refined iteratively through user ratings on resolution of the tickets/jobs. However, for any new data object or ticket/job without any manual rating (and most tickets are likely to remain so), the detection of resolution score is in general automatic.

Embodiment 2: Data Sanitization

A tool such as DocSanitizer can be run through all ticket/job fields and identify the entities containing confidential information. This can be based on algorithms or previously known types and/or formats of potentially confidential information. In a sanitized version of the ticket/job, confidential entities identified in the original ticket can be masked. Non-exhaustive examples of such entities can include: project names, organization names, phone numbers, URLs, email addresses, currency, and/or specific patterns defined by an administrator or the like.

Embodiment 3: Privacy Protected Search

An embodiment of the present invention also provides for privacy protection of a search. Specifically, each input ticket corresponds to two entries in the tool: (1) an original version (To): contains all the data in the same form as the input ticket; and (2) a sanitized version (Ts): contains the data of the input ticket in a sanitized form. The latter is typically created using the Data Sanitization mechanism of Embodiment 2 above.

In general, each user of the system may "belong" to a set of projects. For tickets/jobs belonging to those projects, the user can view the original version (To). For all other tickets/jobs, the user can view only the sanitized version (Ts). Still yet, the ticket/job entries in the index (e.g., Lucene) that is used for the search (as described in Embodiment 1), has two 'fields' or 'flags', in addition to the ticket data, which encodes the type and project information:

project: the project to which To or Ts belongs.
  masked: false for To and true for Ts When the search is issued for a user query, where P is the set of projects to which the user belongs, the following condition is added thereto:

(project:(p1 OR p2 . . . OR pi) and masked:false) OR
(project:(allprojects NOT p1 NOT p2 . . . NOT pi) and
  masked:true) where,
p1, p2, . . . pi cP allprojects can be a "dummy" entry for all tickets/jobs, which makes it possible to issue a NOT query to the index.

Embodiment 4: Classification and Entity Extraction

Classification helps in providing structure to the whole dataset based on the content in the unstructured component of the data. It also helps in easy/efficient navigation through the data. In general, the classification component assigns each ticket/job to one or more categories from a set of predefined domain-specific categories. Such classification can occur via rule based classification (typically about presence of some specific set of words), and/or via statistical classification (trained from a set of ticket-label pairs).

It is understood that a ticket/job could belong to more than one category. In such a case, multi-label classification (e.g., either through a set of binary classifiers for each class or through a single classifier for all the class) could be provided. In addition, categories could be hierarchical through a classifier for each node in the class-hierarchy. Still yet, a well programmed classifier could intrinsically measure the data quality. If content in resolution is not good, the classifier component (e.g., of engine 50 of FIG. 3) may not assign any useful class label to that ticket.

Embodiment 5: Central Repository with Adaptors to Ticketing Tools

Figure 6:
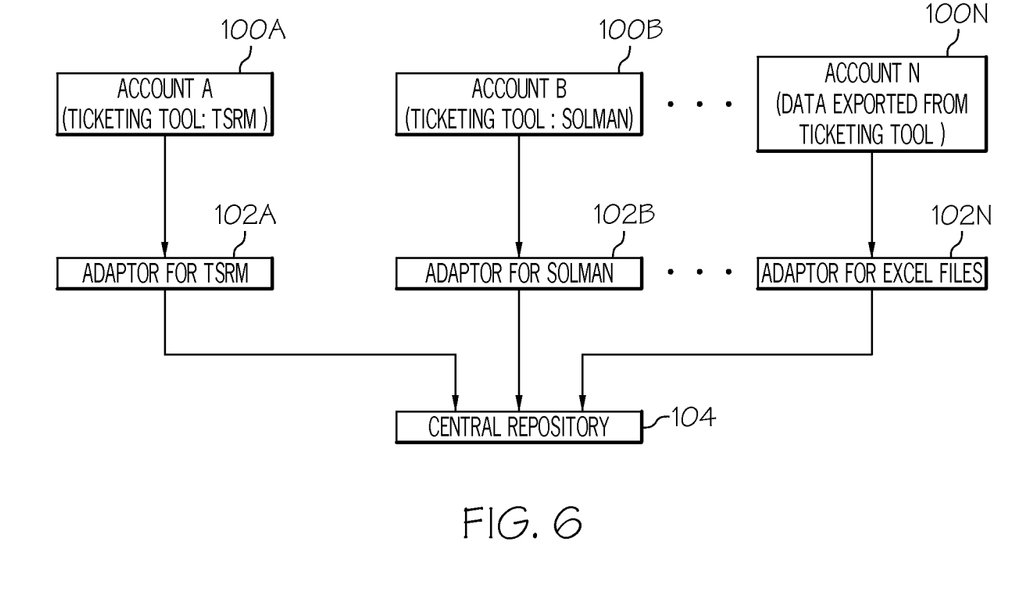
FIG. 6 depicts a diagram showing a central repository of information according to an embodiment of the present invention.

Referring now to FIG. 6, a block diagram of this embodiment is shown. As shown, the present invention provides a central repository 104. Under this embodiment, each tool 100A-N (and corresponding account) can be provided its own adapter 102A-N that is configured to interface with a central repository 104. This also enables each tool to communicate with and store/retrieve data from central repository 104 (e.g., share knowledge across tools and/or accounts).

While shown and described herein as a knowledge/information reuse system, it is understood that the invention further provides various alternative embodiments. For example, in one embodiment, the invention provides a computer-readable/useable medium that includes computer program code to enable a computer infrastructure to provide knowledge/information reuse functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide knowledge/information reuse functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for a knowledge/information reuse. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for reusing information, comprising:
   one or more processors;
   one or more memories;
   receiving a query for a solution to a problem; extracting details from the query;
   performing a search on a set of data stored in at least one computer storage device using the details;
   generating a set of results based on the search;
   determining at least one domain of the set of results;
   sanitizing the set of results prior to the classifying;
   removing private details from the set of results;
   classifying the set of results of the at least one domain into a set of domain-specific categories;
   assessing a quality of each of the set of results based on a usefulness of the set of results, the usefulness being determined using language derived from a problem statement of the query; and
   ranking the set of results within the domain-specific categories based on the quality as assessed.

2. The computer-implemented method of claim 1, the details extracted from the query comprising at least one of the following: a program name, a module name, or a keyword from the query.

3. The computer-implemented method of claim 1, the usefulness being further determined by deriving structural and content level features from text of the query.

4. The computer-implemented method of claim 1, the usefulness being further determined based on a best match of the set of results to the query.

5. A system for reusing information, comprising: a memory medium comprising instructions; a bus coupled to the memory medium; and
   a processor coupled to the bus that when executing the instructions causes the system to:
   receive a query for a solution to a problem; extract details from the query;
   perform a search on a set of data stored in at least one computer storage device using the details;
   generate a set of results based on the search;
   determine a plurality of domains of the set of results;
   sanitize the set of results prior to the classification;
   remove private details from the set of results;
   classify the set of results of the plurality of domains into a set of domain-specific categories;
   assess a quality of each of the set of results based on a usefulness of the set of results, the usefulness being determined using language derived from a problem statement of the query; and
   rank the set of results within the domain-specific categories based on the quality as assessed.

6. The system of claim 5, the details extracted from the query comprising at least one of the following: a program name, a module name, or a keyword from the query.

7. The system of claim 5, the usefulness being further determined by deriving structural and content level features from text of the query.

8. The system of claim 5, the usefulness being further determined based on a best match of the set of results to the query.

9. A computer program product for reusing information, the computer program product comprising a non-transitory computer readable storage media, and program instructions stored on the non-transitory computer readable storage device, to:

receive a query for a solution to a problem;

extract details from the query;

perform a search on a set of data stored in at least one computer storage device using the details;

generate a set of results based on the search;

determine a set of domains of the set of results;

sanitize the set of results prior to the classification;

remove private details from the set of results;

classify the set of results of the set of domains into a set of domain-specific categories;

assess a quality of each of the set of results based on a usefulness of the set of results, the usefulness being determined using language derived from a problem statement of the query; and rank the set of results within the domain-specific categories based on the quality as assessed.

10. The computer program product of claim 9, the details extracted from the query comprising at least one of the following: a program name, a module name, or a keyword from the query.

11. The computer program product of claim 9, the usefulness being further determined by deriving structural and content level features from text of the query.

* * * * *